(12) United States Patent
Knoll et al.

(10) Patent No.: US 10,793,158 B2
(45) Date of Patent: Oct. 6, 2020

(54) METHOD AND DEVICE FOR OPERATING A MOTOR VEHICLE, AND MOTOR VEHICLE

(71) Applicant: Conti Temic Microelectronic GmbH, Nuremberg (DE)

(72) Inventors: Bernd Knoll, Roth (DE); Rainer Ertel, Fürth (DE); Gerhard Hinkel, Happurg (DE); Lars Nitz, Nuremberg (DE)

(73) Assignee: Vitesco Technologies Germany GmbH, Hannover (DE)

( * ) Notice: Subject to any disclaimer, the term of this patent is extended or adjusted under 35 U.S.C. 154(b) by 722 days.

(21) Appl. No.: 15/457,127

(22) Filed: Mar. 13, 2017

(65) Prior Publication Data
US 2017/0183012 A1    Jun. 29, 2017

Related U.S. Application Data

(63) Continuation of application No. PCT/EP2015/070933, filed on Sep. 14, 2015.

(30) Foreign Application Priority Data

Oct. 9, 2014 (DE) .......................... 10 2014 220 490
Nov. 21, 2014 (DE) .......................... 10 2014 223 768

(51) Int. Cl.
*B60W 30/188* (2012.01)
*B60W 10/02* (2006.01)
(Continued)

(52) U.S. Cl.
CPC ........ *B60W 30/1884* (2013.01); *B60W 10/02* (2013.01); *B60W 10/06* (2013.01);
(Continued)

(58) Field of Classification Search
CPC ...... B60W 10/02; B60W 10/06; B60W 10/10; B60W 2030/18081; B60W 2520/10;
(Continued)

(56) References Cited

U.S. PATENT DOCUMENTS 5,217,086 A * 6/1993 Morimoto ............ B60K 31/045
                                                              180/177
5,393,277 A * 2/1995 White .................. B60K 31/047
                                                              477/108
(Continued)

FOREIGN PATENT DOCUMENTS

DE    102011102332 B3    10/2012
DE    102011082893 A1    3/2013
(Continued)

OTHER PUBLICATIONS

International Search Report and Written Opinion dated Jan. 29, 2016 from corresponding International Patent Application No. PCT/EP2015/070933.
(Continued)

*Primary Examiner* — Jacob S. Scott

(57) ABSTRACT

The disclosure relates to a method for operating a motor vehicle that includes a drive unit, an output unit, and a clutch arranged between the drive unit and the output unit and configured to transmit a torque. A detection unit detects an operating state of the drive unit. When the operating state of the drive unit is in an overrun mode, a control unit controls a clutch slip, which results in adjustment of the torque that can be transmitted as a function of a speed of the motor vehicle. The disclosure further relates to a device for operating a motor vehicle, and to a motor vehicle that includes such a device.

19 Claims, 2 Drawing Sheets

(51) Int. Cl.
*B60W 10/06* (2006.01)
*F16D 48/06* (2006.01)
*B60W 10/10* (2012.01)
*B60W 30/14* (2006.01)
*B60W 30/18* (2012.01)

(52) U.S. Cl.
CPC .......... *B60W 10/10* (2013.01); *B60W 30/143* (2013.01); *F16D 48/06* (2013.01); *B60W 2030/18081* (2013.01); *B60W 2520/10* (2013.01); *B60W 2540/10* (2013.01); *B60W 2540/215* (2020.02); *B60W 2710/025* (2013.01); *B60W 2710/027* (2013.01); *B60W 2710/0666* (2013.01); *B60W 2710/10* (2013.01); *B60W 2710/1005* (2013.01); *B60W 2720/10* (2013.01); *F16D 2500/106* (2013.01); *F16D 2500/10412* (2013.01); *F16D 2500/3067* (2013.01); *F16D 2500/30406* (2013.01); *F16D 2500/3108* (2013.01); *F16D 2500/5012* (2013.01); *F16D 2500/5085* (2013.01); *F16D 2500/70426* (2013.01); *F16D 2500/70494* (2013.01)

(58) Field of Classification Search
CPC ......... B60W 2540/04; B60W 2540/10; B60W 2710/027; B60W 2710/0666; B60W 2710/10; B60W 2710/1005; B60W 2720/10; B60W 30/143; B60W 30/1884; B60W 2710/025; F16D 2500/10412; F16D 2500/106; F16D 2500/3067; F16D 2500/3108; F16D 2500/5012; F16D 2500/70494; F16D 48/06; F16D 2500/30406; F16D 2500/70426; F16D 2500/5085

See application file for complete search history.

(56) References Cited

U.S. PATENT DOCUMENTS

| | | | |
|---|---|---|---|
| 6,178,372 B1 | 1/2001 | Tabata et al. | |
| 8,938,341 B2* | 1/2015 | Hwang | B60W 10/115 701/51 |
| 2013/0012355 A1* | 1/2013 | Yamazaki | B60K 6/48 477/93 |
| 2013/0138312 A1* | 5/2013 | Breu | B60W 10/02 701/67 |
| 2016/0207535 A1* | 7/2016 | Bwalanda | B60W 30/143 |
| 2017/0227121 A1* | 8/2017 | Takahashi | B60W 10/06 |

FOREIGN PATENT DOCUMENTS

| | | |
|---|---|---|
| DE | 102012102303 A1 | 5/2013 |
| DE | 102013021441 A1 | 7/2014 |
| EP | 2527679 A1 | 11/2012 |
| JP | H10166900 A | 6/1998 |
| JP | 2000055185 A | 2/2000 |

OTHER PUBLICATIONS

Japanese Office Action dated Apr. 24, 2018 for corresponding German Patent Application No. 2017-518973.
German Office Action dated Mar. 30, 2015 for corresponding German Patent Application No. 10 2014 223 768.8.

* cited by examiner

METHOD AND DEVICE FOR OPERATING A MOTOR VEHICLE, AND MOTOR VEHICLE

CROSS-REFERENCE TO RELATED APPLICATIONS

This application claims the benefit of PCT Application PCT/EP2015/070933, filed Sep. 14, 2015, which claims priority to German Applications DE 10 2014 220 490.9, filed Oct. 9, 2014 and DE 10 2014 223 768.8 file Nov. 11 2014. The disclosures of the above applications are incorporated herein by reference.

TECHNICAL FIELD

The disclosure relates to a method and to a device for operating a motor vehicle. The disclosure furthermore relates to a motor vehicle that includes the device.

BACKGROUND

A known practice in the prior art is to detect whether the movement of a motor vehicle while the latter is being driven is taking place in an overrun mode, that is to say the power is flowing from the wheels, or conversely as in a traction mode. An overrun phase can be detected from the position of a gas pedal, for example. When a motor vehicle driver is no longer actuating the gas pedal, active propulsive force is no longer produced by a primary drive, and the motor vehicle changes to an overrun cutoff operating state. Overrun cutoff, e.g. for an internal combustion engine, is a controlled interruption in the fuel supply, where the clutch is not opened, and a speed of a crankshaft corresponds to a speed on a transmission side and is thus proportional to the input speed at the output. Small speed differences arise due to microslip, possible in principle, which is ignored in the following description for reasons of simplicity. Due to the fact that the crankshaft of the primary drive is still rotating with a sufficient speed, propulsive power can be provided again relatively quickly when there is a corresponding demand from the motor vehicle driver, e.g. via the gas pedal.

PCT/EP2011/004666 describes a method for a motor vehicle having a drive used to rotate a shaft of the drive, the shaft being coupled via an intermediate device to ground contact elements of the motor vehicle, where different torques can be transmitted between the drive and the intermediate device via the intermediate device by varying a manipulated variable. While the motor vehicle is being driven, there is detection of whether the movement of the motor vehicle is taking place in the overrun mode and, if this is the case, the speed of the shaft of the drive is reduced by automatically adjusting the manipulated variable.

SUMMARY

Therefore it is desirable to specify a method for operating a motor vehicle which is an improvement over the prior art, and to specify an improved device for operating a motor vehicle and to specify an improved motor vehicle.

One aspect of the disclosure provides a method for operating a motor vehicle. The motor vehicle includes a drive unit, an output unit, and a clutch, which is arranged therebetween and which is configured to transmit a torque. An operating state of the drive unit is detected by a detection unit and, if an overrun mode is detected, a control unit controls a clutch slip and, resulting therefrom, the torque that can be transmitted is also controlled in accordance with or as a function of a speed of the motor vehicle.

The advantage of the method according to the disclosure consists in the fact that a preset speed of the motor vehicle in the overrun mode is maintained for longer than in the prior art by means of the control unit. Better utilization of kinetic energy of the motor vehicle and particularly large fuel savings are advantageously obtained.

The clutch is taken to mean a machine element that is arranged as a variable link between the drive unit and the output unit in the drive train of the motor vehicle, in particular a friction clutch or an automatic converter system.

To set the motor vehicle in motion, the drive unit is needed. The drive unit includes at least one primary drive, which is an internal combustion engine, for example, and is designed to rotate a shaft, such as, for example, a crankshaft. To enable the torque produced by the drive unit via the shaft to be exploited in a useful way, the torque is transmitted to the output unit by the clutch, which is arranged after the drive unit in the direction of power flow. Thus, the output unit is arranged after the clutch in the direction of power flow and includes all the components arranged after the clutch, such as, for example a transmission, a number of output shafts, and a number of wheels.

The overrun cutoff operating state describes a controlled interruption in a fuel supply to the drive unit. During this process, for example, a gas pedal is not actuated but a gear of the output unit is selected and therefore the drive unit is not idling. The drive unit does not produce any energy but instead absorbs energy. By virtue of an inertial mass of the output unit, the drive unit is driven without consuming fuel. Overrun cutoff causes power loss since the output unit is retarded by internal friction and internal compression in the drive unit. This power dissipation represents an engine brake.

As an alternative to overrun cutoff, there is a known practice in the prior art of opening the clutch in overrun and operating the drive unit at idle. In this case, the drive unit does not absorb any kinetic energy, but the drive unit consumes fuel in the idling mode. Compared with this prior art, the clutch is not fully opened by the method according to the disclosure, while the motor vehicle is operated for longer in the overrun mode and does not consume any fuel.

It is furthermore possible in the prior art to open the clutch in the overrun mode and to switch off the drive unit. As a result, the drive unit neither consumes fuel nor absorbs kinetic energy. With the drive unit switched off, auxiliary units, such as, for example, a brake booster, a power assisted steering system, and/or an air-conditioning compressor, are supplied by separate power sources. Moreover, an acceleration here requires a process of restarting the drive unit, which significantly delays a start of acceleration. In contrast, the method according to the disclosure has the advantage, in particular, that the drive unit is held in one mode and auxiliary units continue to be supplied by the drive unit during the overrun mode, and the drive unit does not have to be restarted for an acceleration, while nevertheless no fuel is consumed owing to the overrun mode.

In some implementations, the clutch slip is set in an operating range between 0% and less than 100% by the control unit, where clutch slip refers to a difference between a speed of a primary drive shaft and an input speed at the output, such as, for example, a transmission input speed. A clutch slip of 100% is not possible during an overrun cutoff since, when 100% is reached, the drive unit changes to the idling operating state, where the drive unit is separated from the output unit. By virtue of the control unit, it is advantageously possible to modulate the transmissible torque and thus to influence the action of the engine brake.

In some examples, the clutch slip is controlled by the control unit in such a way that the speed of the motor vehicle is equal to a preset target speed or is held in a pre-determined range around the preset target speed. As a result, it is possible to hold the preset target speed of the motor vehicle for longer in the overrun mode, i.e., the motor vehicle can be operated for longer at the preset target speed in the overrun mode. This results in an advantageous, particularly large saving in consumption.

In some implementations, the target speed of the motor vehicle is set by means of a speed setting unit of a cruise control system. User-friendly operation is thus made possible, where the vehicle driver sets a preferred speed of the motor vehicle, and additional operating steps are carried out by the method according to the disclosure. The method according to the disclosure allows a vehicle driver to make optimum use of the kinetic energy of the motor vehicle and thus to operate the motor vehicle in such a way as to save fuel.

In some examples, data exchange is carried out between the control unit and the detection unit. Transmission of data relating to the method according to the disclosure and monitoring of the functioning of the control unit by the detection unit is thus possible in an advantageous manner.

In some implementations, a step-by-step controlled overrun control system is assisted in such a way that the controllable clutch slip compensates the steps of the overrun control system, in particular a gear change. Here, the method according to the disclosure controls the gears of the motor vehicle in such a way that a gear and thus a high speed of the drive unit remains selected in the overrun mode even though a transmission control unit would carry out a gear change to a higher ratio, using a conventional designation of the gears, outside the overrun mode. It is thus possible, in the case of a downhill slope, to delay acceleration of the motor vehicle by the engine brake. In this case, for example, a gear change to a lower ratio, using a conventional designation of the gears, is carried out, and a higher speed of the drive unit is achieved, where a higher power dissipation is produced. By means of the control unit, it is possible to control the clutch slip in such a way that the higher power dissipation, which serves as an engine brake, relieves the load on the service brake system of the motor vehicle, where the speed of the motor vehicle does not decrease below a value of the preset speed or increase above said value. Here, a downward gear change through several gears is possible, wherein each gear can be selected individually or a number of gears can be skipped, e.g., a downshift directly from fourth gear to second gear. During this process, a maximum speed of the drive unit must not be exceeded so as to avoid mechanical overloading.

In some implementations, a step-by-step controlled overrun control system is assisted in such a way that the controllable clutch slip compensates the steps of the overrun control system, in particular a gear change, only when a signal for holding the gear is transmitted to the control unit by means of the transmission control unit without impairing safety functions of the drive unit, e.g., mechanical overloading. Thus, the transmission control unit is higher-ranking than the control unit. In this way, maintenance of safety functions relating to the drive unit is ensured in an advantageous manner.

One aspect of the disclosure provides the device for operating a motor vehicle. The motor vehicle includes a drive unit, an output unit, and a clutch, which is arranged therebetween and which is provided for transmitting a torque. The motor vehicle includes a detection unit for detecting an operating state of the drive unit, and a control unit for varying the clutch slip and, resulting therefrom, the torque that can be transmitted is also controlled if an overrun mode is detected. By controlling the clutch slip, it is advantageously possible, in comparison with the prior art, to hold the motor vehicle for longer in the overrun mode and to achieve a particularly large fuel saving.

In some examples, the detection unit is set up to detect the operating state of the drive unit, for example. It is furthermore possible, by means of the detection unit, to detect various signals relating to the motor vehicle. For example, the detection unit is designed as a drive control unit that detects a load demand on the drive unit and/or a speed of the motor vehicle. The detection unit can advantageously carry out monitoring of the functions of the control unit.

The details of one or more implementations of the disclosure are set forth in the accompanying drawings and the description below. Other aspects, features, and advantages will be apparent from the description and drawings, and from the claims.

DESCRIPTION OF DRAWINGS

Illustrative examples of the disclosure are explained in greater detail below by means of drawings, in which.

Corresponding parts are provided with the same reference signs in all the figures.

DETAILED DESCRIPTION

Figure 1:
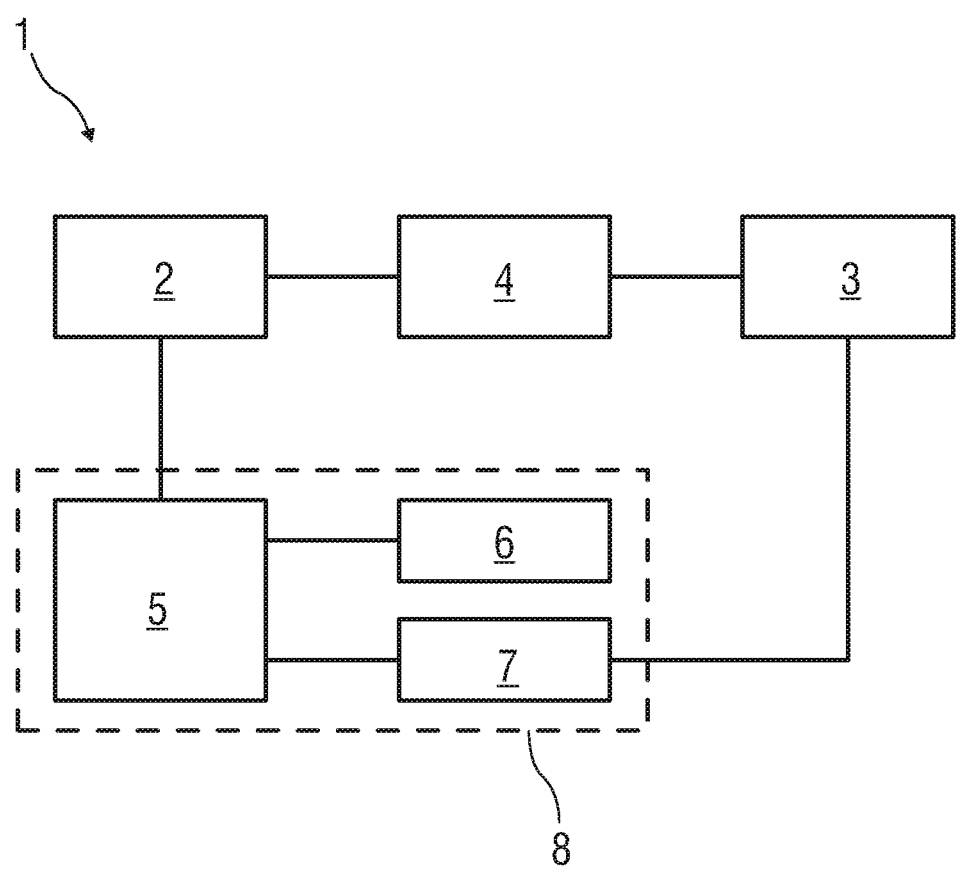
FIG. 1 shows schematically a block diagram of a possible illustrative embodiment.

FIG. 1 shows a block diagram of a motor vehicle 1. The motor vehicle 1 includes a drive unit 2 for producing a torque, an output unit 3, which uses the torque produced for an output drive, and a clutch 4 for transmitting the torque from the drive unit 2 to the output unit 3. In some examples, the motor vehicle 1 includes a device 8 that includes a detection unit 5 for detecting an operating state of the drive unit 2, a control unit 6 for controlling a clutch slip, and a cruise control system 7 for setting a speed v (not shown specifically in FIG. 2) of the motor vehicle 1.

The control unit 6 controls the clutch slip in an overrun mode in such a way that the speed v of the motor vehicle 1 corresponds to a preset target speed of the motor vehicle 1 or is held within a predetermined range around the target speed.

The control unit 6 adjusts the clutch slip in an operating range between 0% and less than 100%, thus allowing modulation of the transmissible torque.

The target speed of the motor vehicle 1 is set by a speed setting unit of a cruise control system 7.

Data exchange is carried out between the control unit 6 and the detection unit 5, allowing the transmission of information, e.g. the speed v of the motor vehicle 1, between the control unit 6 and the detection unit 5.

In some implementations (not shown), the motor vehicle 1 is driven by the drive unit 2, which includes at least one internal combustion engine, and the torque is transmitted by the clutch 4 and the output unit 3, which includes a transmission, a number of output shafts and a number of wheels. The motor vehicle 1 includes a gas pedal, which when actuated, fuel is injected into the internal combustion engine. In the present case, the clutch 4 is controllable and can variably control the torque to be transmitted with otherwise constant conditions. A motor vehicle driver sets a speed v of the motor vehicle 1 by means of a cruise control system 7 and no longer actuates the gas pedal. When the motor vehicle 1 travels down a slope in the course of the journey, the motor vehicle 1 changes to the overrun cutoff operating state, which is detected by the detection unit 5. During overrun cutoff, the drive unit 2 is driven and produces no forward propulsion. The lost energy is initially produced by friction in the drive unit 2 and the output unit 3 and brakes the motor vehicle 1 and an engine brake acts, where the motor vehicle 1 initially loses speed v. In order to hold the preset speed v of the motor vehicle 1, the clutch slip is controlled by the control unit 6 in such a way that the clutch 4 is not completely closed and hence the motor vehicle 1 is braked less strongly than with conventional retardation by overrun cutoff. The control unit 6 can thus keep the speed v of the motor vehicle 1 for longer in a preset range within the operating range, where, in contrast to the prior art, the kinetic energy of the motor vehicle 1 is used more effectively and a particularly large fuel saving is made possible.

The device 8 makes it possible for a step-by-step controlled overrun control system to be assisted in such a way that the controllable clutch slip compensates the steps of the overrun control system, in particular a gear change.

The motor vehicle 1, a heavy goods vehicle, is driving down a hill with a high total weight and is in overrun cutoff mode. Due to the high total weight of the motor vehicle 1, the speed v of the motor vehicle 1 initially increases. In order to counteract overheating of a service brake system and a reduction in braking performance, the steps of the step-by-step controlled overrun control system should be compensated by the method according to the disclosure. When the preset speed v of the motor vehicle 1 is exceeded, a downward gear change is carried out, using a conventional designation of gears G (shown in detail in FIG. 2) of a transmission, and thus a higher engine speed n1 (likewise shown in FIG. 2) is achieved, where a higher power dissipation of the drive unit 2 and a higher braking effect is produced.

The control unit 6 controls closing or opening of the clutch 4 only to such an extent that the engine brake brakes the motor vehicle 1 to the preset speed v. The service brake system can be assisted by the compensation of the gears G, thereby advantageously increasing the life of the service brake system.

In some implementations (not shown), a change in the preset speed v is carried out during the execution of the method.

For example, the motor vehicle driver sets the speed v of the motor vehicle 1 by means of the cruise control system 7 and no longer actuates the gas pedal. During control of the clutch slip by the control unit 6, the motor vehicle driver reduces the preset speed v. The method compensates the gear changes in such a way that an optimum engine braking power for the method is achieved by shifting the gears G into optimum speed ranges. At the same time, the clutch slip is controlled in such a way that the preset reduced speed v is achieved and held.

Figure 2:
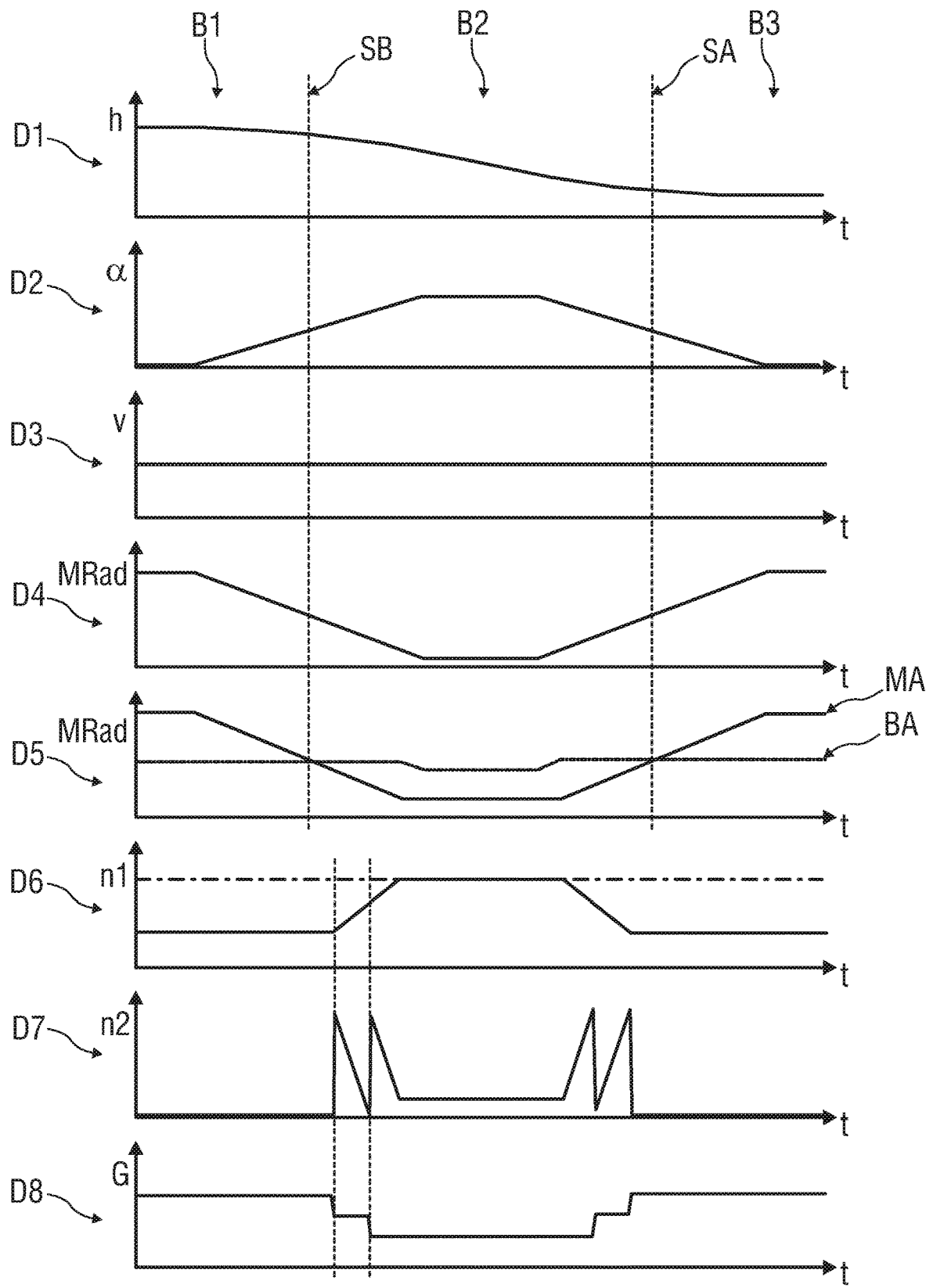
FIG. 2 shows schematically a height profile of a roadway section and an associated roadway slope as well as motor-vehicle-specific parameters while traveling over the roadway section using one illustrative embodiment of the method according to the disclosure.

FIG. 2 shows a height profile h of a roadway section and an associated roadway slope α as well as parameters specific to the motor vehicle while traveling over the roadway section using one possible example of the method according to the disclosure.

The example is described using eight diagrams D1 to D8, where diagrams D1 to D5 are divided into three ranges B1 to B3. A first range B1 represents a plane and an increasing slope, a second range B2 represents a constant slope and a third range B3 represents a falling slope and the plane of the roadway section.

The first range B1 and the second range B2 are separated by means of a first separating line, where this line describes a beginning SB of the overrun mode of the motor vehicle 1. The second range B2 and the third range B3 are separated by a second separating line, where this line indicates an end of overrun cutoff and is designated as overrun exit SA.

All the diagrams D1 to D8 refer to a time t on a respective x axis.

A first diagram D1 describes the height profile h as a function of time t, with a y axis being labeled with a height h. In the first range B1, the motor vehicle 1 is traveling on a slope, where the motor vehicle driver is no longer actuating the gas pedal since the motor vehicle 1 is now being accelerated by a downhill gravitational force. To avoid exceeding a desired speed v, the motor vehicle 1 must be braked.

A second diagram D2 describes the roadway slope α as a function of time t, with the y axis being labeled with an angle α.

A third diagram D3 describes a speed v as a function of time t, with the y axis being labeled with a speed v, where the speed v is set to a constant level by the method.

A fourth diagram D4 describes a wheel torque MRad as a function of time t, with the y axis being labeled with the wheel torque MRad. As soon as the wheel torque MRad reaches a zero crossing, the overrun mode begins and the holding of the speed v by the method begins.

A fifth diagram D5 describes the wheel torque MRad, but divided into an engine component MA and a service brake component BA, as a function of time t, with the y axis being labeled with the wheel torque MRad. A time period for active braking by the motor vehicle driver is reduced and higher engine speeds n1 can be approached in order to make maximum use of the engine braking power.

A third and fourth separating line are shown in diagrams D6 to D8, where these lines enclose a fourth range B4, which represents a change of a gear G.

The sixth diagram D6 describes an engine speed n1 as a function of time t, with the y axis being labeled with the engine speed n1. The gear change is carried out at the beginning of the overrun mode, where the maximum engine speed n1 and thus a maximum engine braking power can be exploited over virtually the entire overrun mode.

The seventh diagram D7 describes a reference speed n2 of the clutch 4 as a function of time t, with the y axis being labeled with a differential speed n2. After a downshift, the engine speed n1 is reduced by means of the controlled clutch slip to a differential speed n2 with the value zero until a gear G is fully engaged, i.e., the clutch is completely closed. When the differential speed n2 is zero and the maximum engine speed n1 has not yet been reached, the next downshift is carried out.

The eighth diagram D8 describes a gear G as a function of time t, with the y axis being labeled with a number of gears G. When the maximum engine speed n1 has been achieved, the differential speed n2 remains constant and engine braking torque can no longer be built up. If there is a further requirement for braking, other braking systems on the motor vehicle, e.g., a service brake, must now be activated in addition.

A number of implementations have been described. Nevertheless, it will be understood that various modifications may be made without departing from the spirit and scope of the disclosure. Accordingly, other implementations are within the scope of the following claims.

What is claimed is:

1. A method for operating a motor vehicle having a drive unit, an output unit, and a clutch arranged therebetween and configured to transmit a torque, the method comprising:
   detecting, at a detection unit, an operating state of the drive unit;
   when an overrun mode is detected, controlling, by a control unit, a clutch slip which results in controlling the torque as a function of a speed of the motor vehicle; and
   wherein a step-by-step controlled overrun control system is assisted in such a way that the controllable clutch slip compensates the steps of the overrun control system, in particular a gear change, by exploitation of a maximum engine speed and thus a maximum engine braking power over the overrun mode.

2. The method of claim 1, further comprising:
   controlling, at the control unit, the clutch slip so that a speed of the motor vehicle is equal to a preset target speed of the motor vehicle or is held in a predetermined range around the preset target speed.

3. The method of claim 1, further comprising:
   setting, at the control unit, the clutch slip in an operating range between 0% and less than 100%.

4. The method of claim 3, further comprising:
   setting, by a speed setting unit of a cruise control system, a target speed of the motor vehicle.

5. The method of claim 1, further comprising exchanging data between the control unit and the detection unit.

6. The method of claim 1, wherein the controllable clutch slip compensates the steps of the overrun control system further comprises the drive unit remaining in overrun mode even though a transmission control unit would carry out a gear change.

7. The method of claim 1, further comprising controlling the clutch slip such that a higher power dissipation through the clutch serves as an engine brake.

8. The method of claim 1, wherein during the overrun mode, when a differential speed is zero and a the maximum engine speed has not been reached, a downshift is carried out without exceeding the maximum engine speed.

9. The method of claim 8, wherein during the overrun mode and following the downshift, when the maximum engine speed is reached, the differential speed remains constant and any further braking is performed by a service braking system of the motor vehicle.

10. A device for operating a motor vehicle comprising a drive unit, an output unit, and a clutch arranged therebetween and configured to transmit a torque, the device comprising:
    a detection unit configured to detect an operating state of the drive unit;
    a control unit configured to vary a clutch slip and, resulting therefrom, in changing the torque that can be transmitted when an overrun mode is detected; and
    wherein the control unit is a step-by-step controlled overrun control system and wherein the controllable clutch slip assist the step-by-step controlled overrun control system to compensate the steps of the overrun control system, in particular a gear change by exploiting a maximum engine speed and thus a maximum engine braking power over an entire overrun mode.

11. The device of claim 10, wherein the step-by-step controlled overrun control system further comprises the drive unit remaining in overrun mode even though a transmission control unit would carry out a gear change.

12. The device of claim 10, wherein the clutch slip is varied by the control unit such that a higher power dissipation through the clutch serves as an engine brake.

13. The device of claim 10, wherein during the overrun mode, when a differential speed is zero and a the maximum engine speed has not been reached, a downshift is carried out without exceeding the maximum engine speed.

14. The device of claim 13, wherein during the overrun mode and following the downshift, when the maximum engine speed is reached, the differential speed remains constant and any further braking is performed by a service braking system of the motor vehicle.

15. A motor vehicle comprising a device for operating a motor vehicle comprising a drive unit, an output unit, and a clutch arranged therebetween and configured to transmit a torque, the device comprising:
    a detection unit configured to detect an operating state of the drive unit;
    a control unit configured to vary a clutch slip and, resulting therefrom, in changing the torque that can be transmitted when an overrun mode is detected; and
    wherein the control unit is a step-by-step controlled overrun control system and wherein the controllable clutch slip assist the step-by-step controlled overrun control system to compensate the steps of the overrun control system, in particular a gear change, by exploiting a maximum engine speed and thus a maximum engine braking power over an entire overrun mode.

16. The vehicle of claim 15, wherein the step-by-step controlled overrun control system further comprises the drive unit remaining in overrun mode even though a transmission control unit would carry out a gear change.

17. The vehicle of claim 15, wherein the clutch slip is varied by the control unit such that a higher power dissipation through the clutch serves as an engine brake.

18. The motor vehicle of claim 15, wherein during the overrun mode and following the downshift, when the maximum engine speed is reached, the differential speed remains constant and any further braking is performed by a service braking system of the motor vehicle.

19. The motor vehicle of claim 18, wherein during the overrun mode and following the downshift, when the maximum engine speed is reached, the differential speed remains constant and any further braking is performed by a service braking system of the motor vehicle.

* * * * *